(12) United States Patent
Sooklaris

(10) Patent No.: US 11,878,549 B1
(45) Date of Patent: Jan. 23, 2024

(54) SUBSTRATE FOR PAINTING, PARTICULARLY ALCOHOL INK PAINTING

(71) Applicant: John Sooklaris, San Diego, CA (US)

(72) Inventor: John Sooklaris, San Diego, CA (US)

(*) Notice: Subject to any disclaimer, the term of this patent is extended or adjusted under 35 U.S.C. 154(b) by 980 days.

(21) Appl. No.: 16/574,016

(22) Filed: Sep. 17, 2019

Related U.S. Application Data

(60) Provisional application No. 62/732,511, filed on Sep. 17, 2018.

(51) Int. Cl.
*B44D 3/18* (2006.01)
*C09D 7/65* (2018.01)
*C09D 7/61* (2018.01)
*C09D 11/00* (2014.01)
*C09D 127/06* (2006.01)

(52) U.S. Cl.
CPC ................ *B44D 3/18* (2013.01); *C09D 7/61* (2018.01); *C09D 7/65* (2018.01); *C09D 11/00* (2013.01); *C09D 127/06* (2013.01)

(58) Field of Classification Search
None
See application file for complete search history.

(56) References Cited

U.S. PATENT DOCUMENTS

| | | | | |
|---|---|---|---|---|
| 4,065,596 A | * | 12/1977 | Groody | B44D 3/18 |
| | | | | 428/537.1 |
| 4,853,061 A | * | 8/1989 | Leung | C08G 18/0866 |
| | | | | 156/216 |
| 2006/0121320 A1 | * | 6/2006 | Allen | B44D 3/18 |
| | | | | 428/319.3 |

FOREIGN PATENT DOCUMENTS

| | | | | |
|---|---|---|---|---|
| CA | 2599431 A1 | * | 9/2006 | |
| JP | H0677622 | * | 11/1994 | |
| JP | H09314748 A | * | 12/1997 | |
| JP | 3468708 B2 | * | 8/2000 | |
| WO | WO-8909137 A1 | * | 10/1989 | |
| WO | WO-2009007968 A2 | * | 1/2009 | ............ C09D 11/36 |
| WO | WO-2017127019 A1 | * | 7/2017 | |
| WO | WO-2019134983 A1 | * | 7/2019 | |

OTHER PUBLICATIONS

Machine translation JP-3468708B2 (Year: 2000).*

* cited by examiner

*Primary Examiner* — Alexandre F Ferre
(74) *Attorney, Agent, or Firm* — Thomas M. Freiburger

(57) ABSTRACT

A substrate for use with alcohol inks has a vinyl coating on one side of a stiff board, and optionally on both sides. The vinyl surface is ideal for painting with alcohol inks to achieve effects preferred by many artists.

6 Claims, 20 Drawing Sheets

SUBSTRATE FOR PAINTING, PARTICULARLY ALCOHOL INK PAINTING

BACKGROUND OF THE INVENTION

This application claims benefit of provisional application Ser. No. 62/732,511, filed Sep. 17, 2018.

This invention is generally in the field of art materials, and more specifically the invention is concerned with substrates for use of artists, particularly using alcohol inks but also useful with water based inks and paints.

Alcohol inks have recently become popular as a medium for artists. The inks are quick to dry. Interesting effects are achieved using various colors of the inks, which can be blended in a vessel or more preferably, directly on the substrate to which they are applied. Typically the artist dispenses a small quantity of each ink color into a cup or a watercolor paint palette with dished depressions. To paint the ink onto the substrate, the artist can use brushes, cotton-tip swabs, wooden sticks, the edge of a sheet of paper or other selected tools, or the ink can be directly applied in drops from a dropper.

Normally, the substrate is laid horizontal, since the inks will run with gravity. Some artists tilt the substrate to cause the paints to run to some desired extent. The inks produce somewhat translucent layers and interesting designs can be achieved, particularly abstract designs, by overlaying edges of colors. Sometimes an artist will use a drinking straw to blow and move the wet ink along the substrate. If the artist leaves the alcohol inks in open vessels for a period of time the inks will dry, but they can be reconstituted later by adding alcohol, and used again.

The substrate surface on which the alcohol inks are used is very important. Highly porous surfaces are usually not desired, as they soak in inks excessively and do not flow on the surface as is usually desired. One substrate promoted and often used for alcohol inks is YUPO, marketed by Yupo Corporation America of Chesapeake, Virginia, which is a product in flexible cardstock form, with a surface of very thin, sheet polypropylene. The substrate has very little porosity, and thus little absorption, and allows the artist to produce paintings by moving the inks around, blending them on the surface, using a variety of different tools and arriving at interesting design effects, with rich colors if desired.

Other substrates have also been used for alcohol inks, but the inks usually are not applied to paper or canvas.

SUMMARY OF THE INVENTION

According to the current invention, an improved alcohol ink substrate is provided, to provide a unique combination of ink on substrate. A board, preferably rigid or with at least some degree of stiffness, is coated on at least one side with vinyl, which can be primarily polyvinyl chloride.

In one form the alcohol ink vinyl substrate of the invention comprises vinyl coated on ⅛ inch fiberboard, preferably MDF, and in a preferred embodiment the vinyl coating is on both sides. Such a substrate is stiff, only bendable with deliberate force. At 8"×10" size the board is very stiff. The vinyl surface behaves as if slightly porous, preferably somewhat more ink-gripping than the polypropylene product described above, and the substrate board of the invention is much stiffer than the unmounted YUPO substrate.

Because of the characteristics and properties of the substrate, especially the vinyl painting surface with its particular surface texture and apparent porosity, the invention allows for very interesting effects when alcohol inks are applied, different from effects produced on other substrates. In addition, the stiff substrate is more easily handled and used than a flimsy sheet as in the prior art. Further, with vinyl coating on both sides, each substrate can be used for two different artworks. Another benefit of the doubly-coated substrate is that the panel is moisture-sealed on both sides, which is needed in any event to maintain the shape of a wood panel, preventing bowing. Still another advantage of the vinyl on both sides is the ability to provide substrate panels with two sides of different colors, such as white and black.

In one preferred embodiment the substrate is MDF (medium density fiberboard) coated with about 3 mils film of vinyl, primarily PVC, adhered to the board with a water-based adhesive.

The MDF-mounted vinyl surface has a specific roughness or texture that on a microscopic level is far different from a typical polypropylene surface. It has much higher peaks and deeper valleys, not observed with the naked eye, that grip the alcohol inks in such a way that the inks do not run or spread as on a smoother surface, thus appearing to exhibit some degree of porosity. This gives the artist greater control with the inks and their manipulation on the surface, as in making lines and distinct shapes.

These and other objects, advantages and features of the invention will be apparent from the following description of a preferred embodiment, considered along with the accompanying drawings.

DESCRIPTION OF PREFERRED EMBODIMENTS

Figure 1:
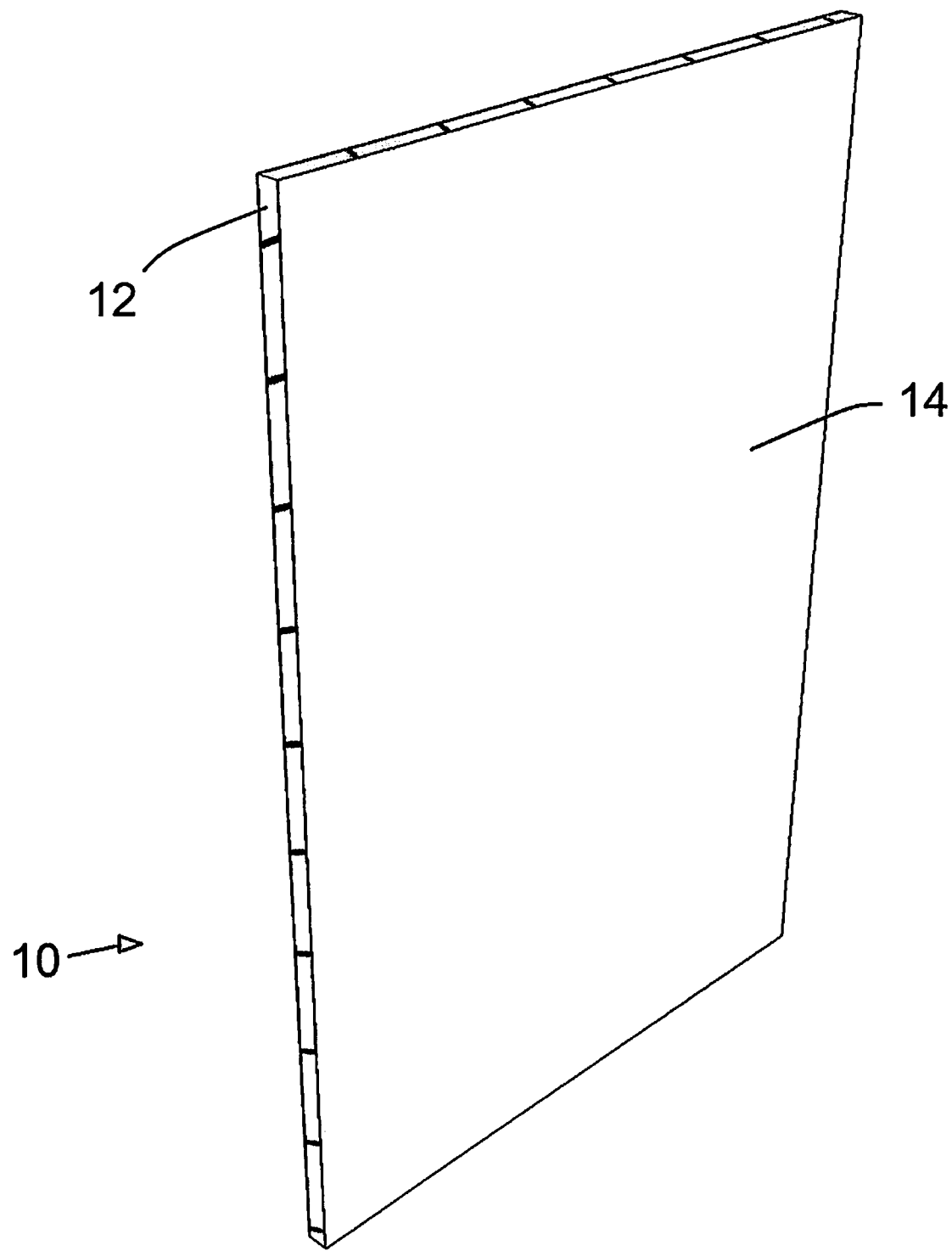
FIG. 1 is a perspective view showing the preferred embodiment of the vinyl coated alcohol ink substrate of the invention.
Figure 2:
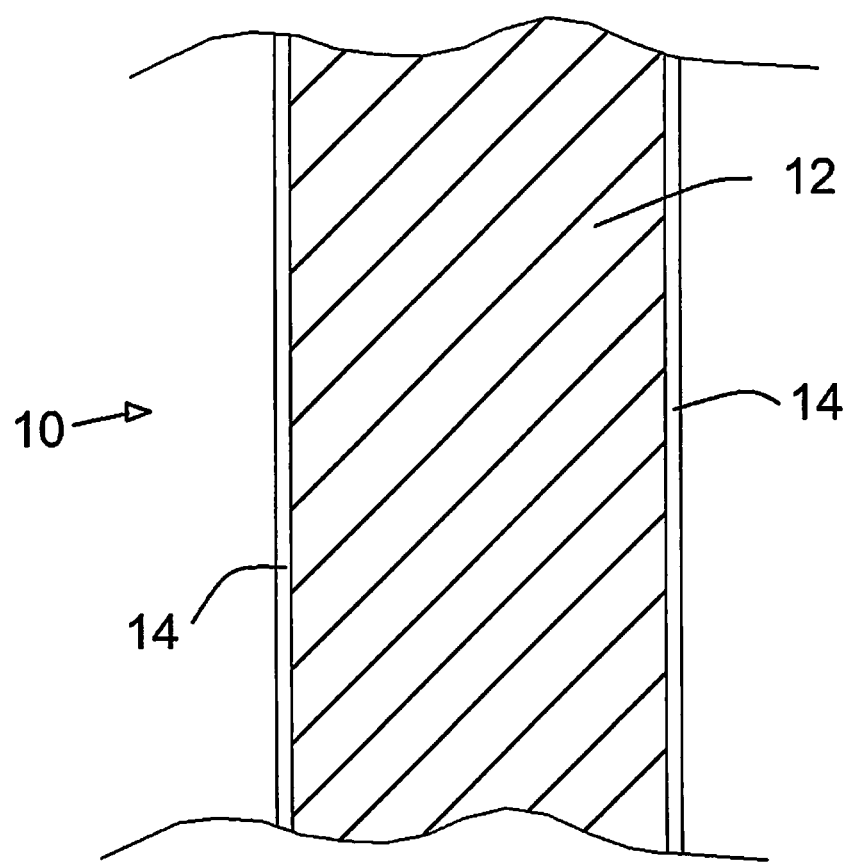
FIG. 2 is a sectional view showing the vinyl film laminated onto a sheet of fiberboard to form the substrate.
Figure 3:
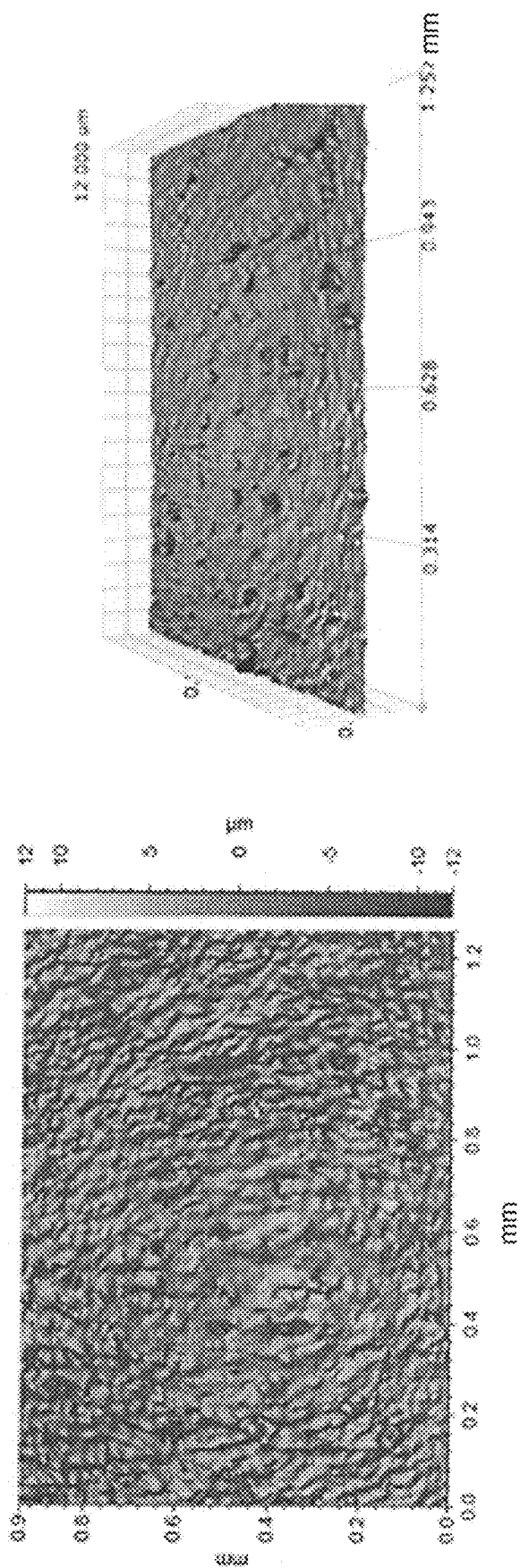
FIGS. 3-16 show results of optical profilometry surface analysis on polypropylene alcohol ink sheets and on the vinyl surface of the invention, with and without ink on the surface.
Figure 4:
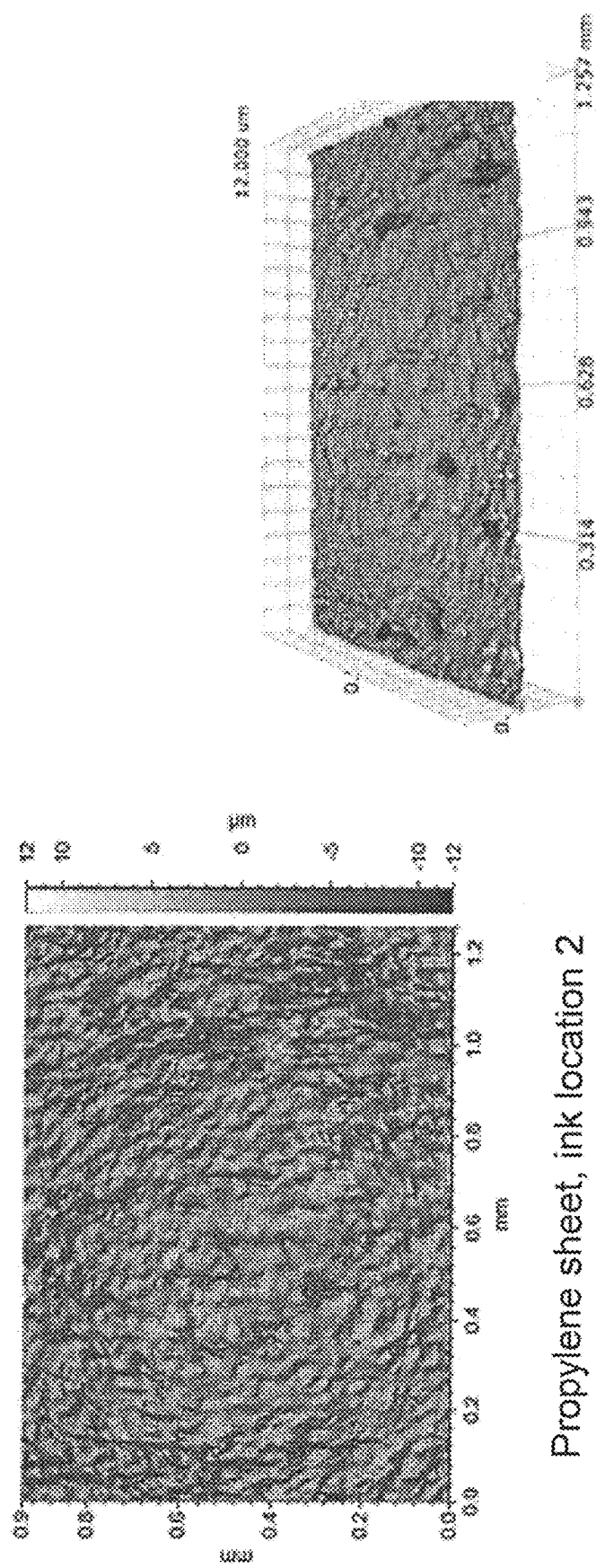
Figure 5:
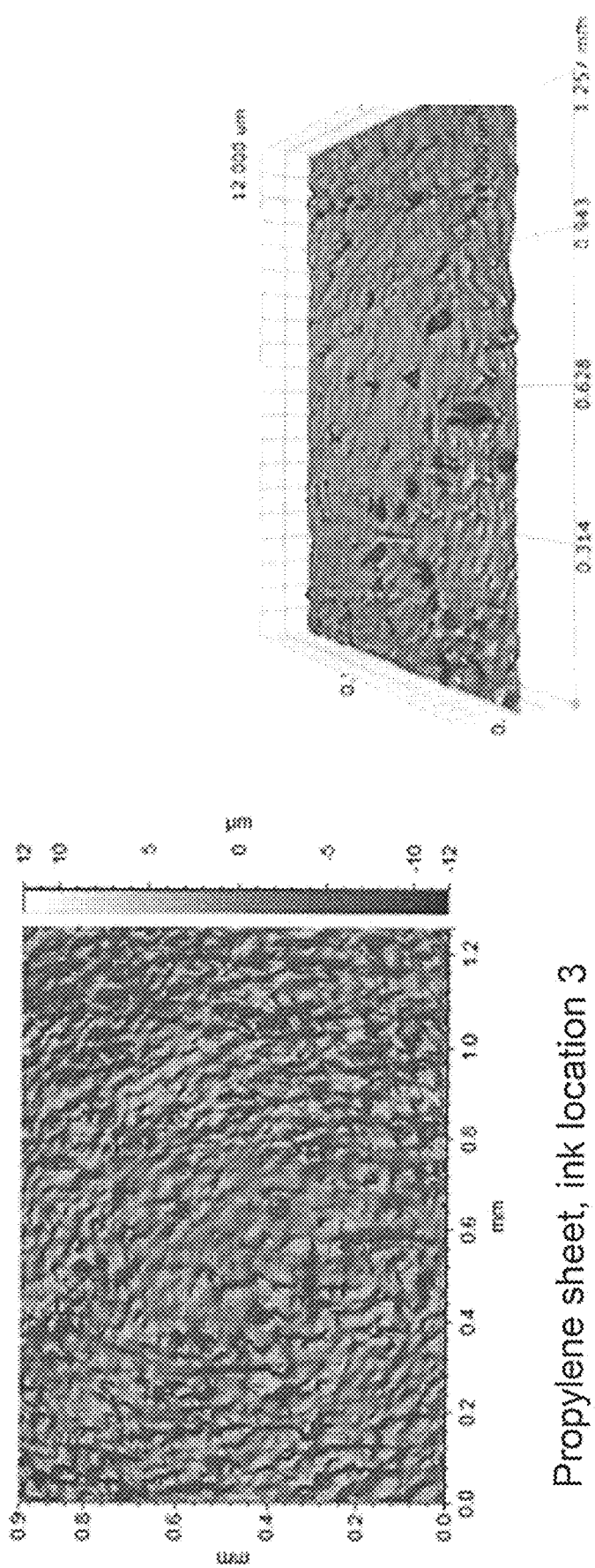
Figure 6:
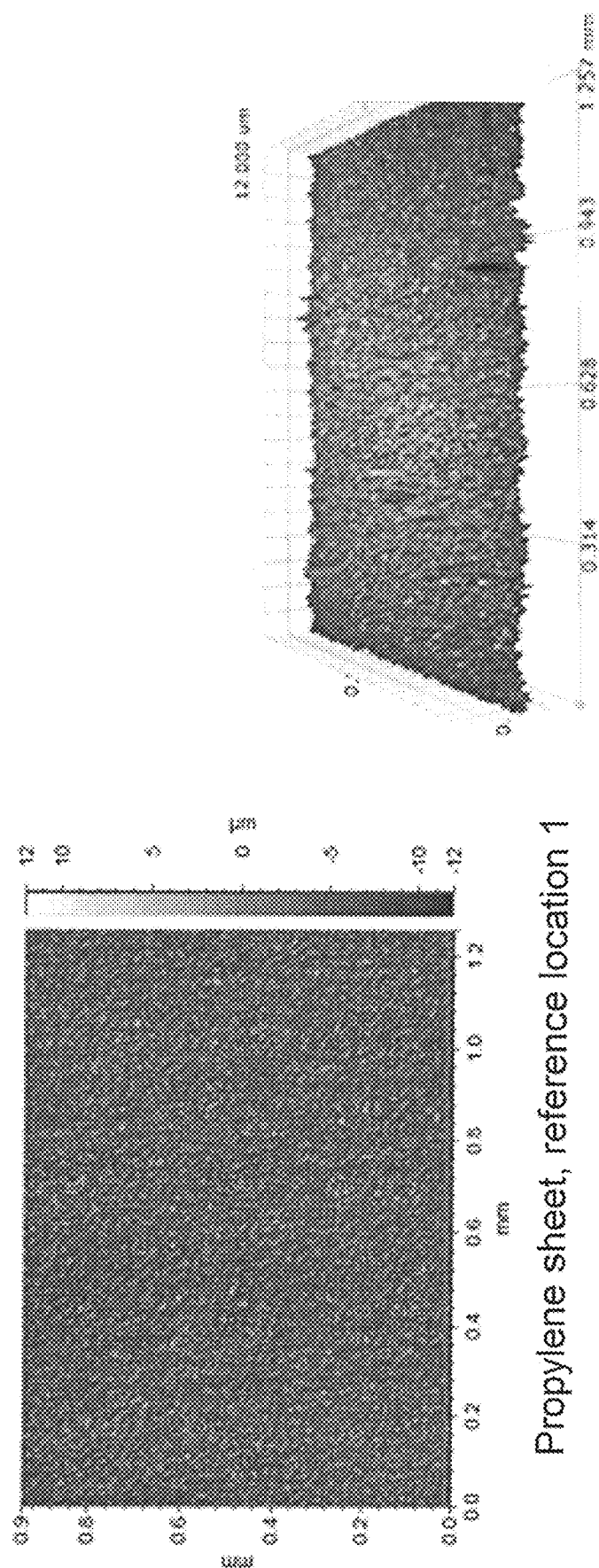
Figure 7:
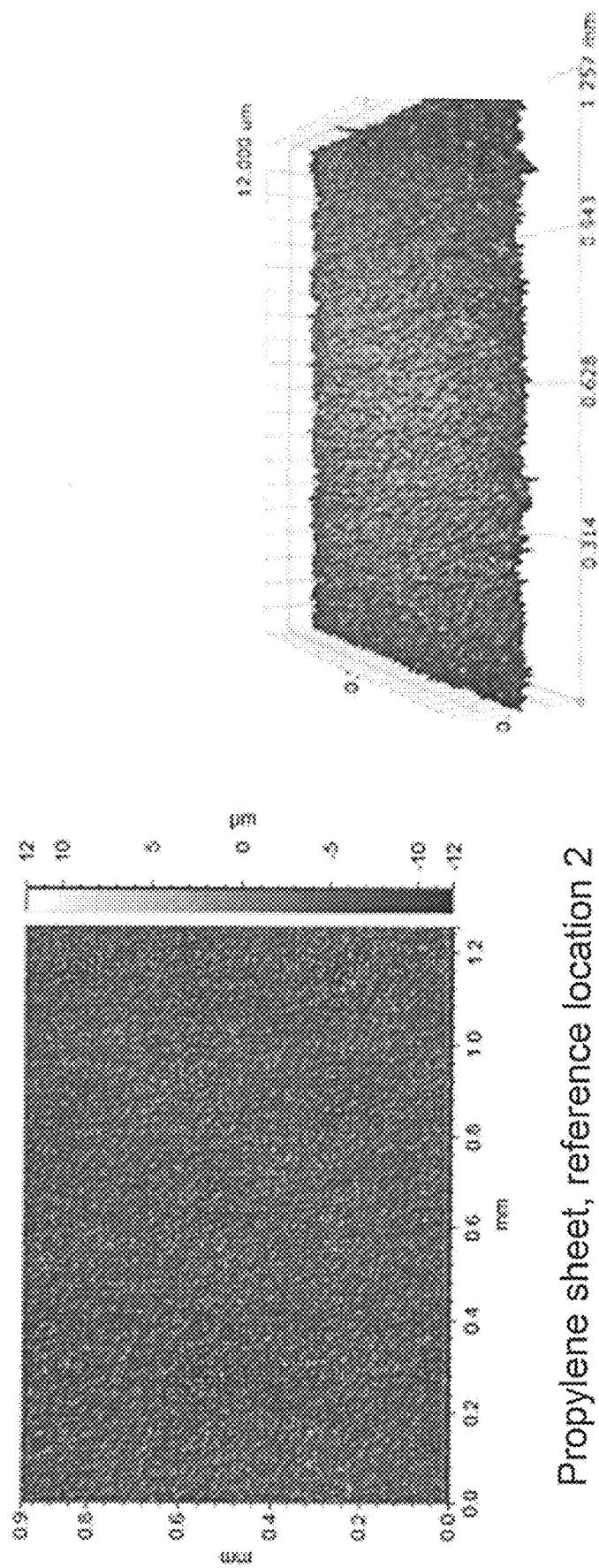
Figure 8:
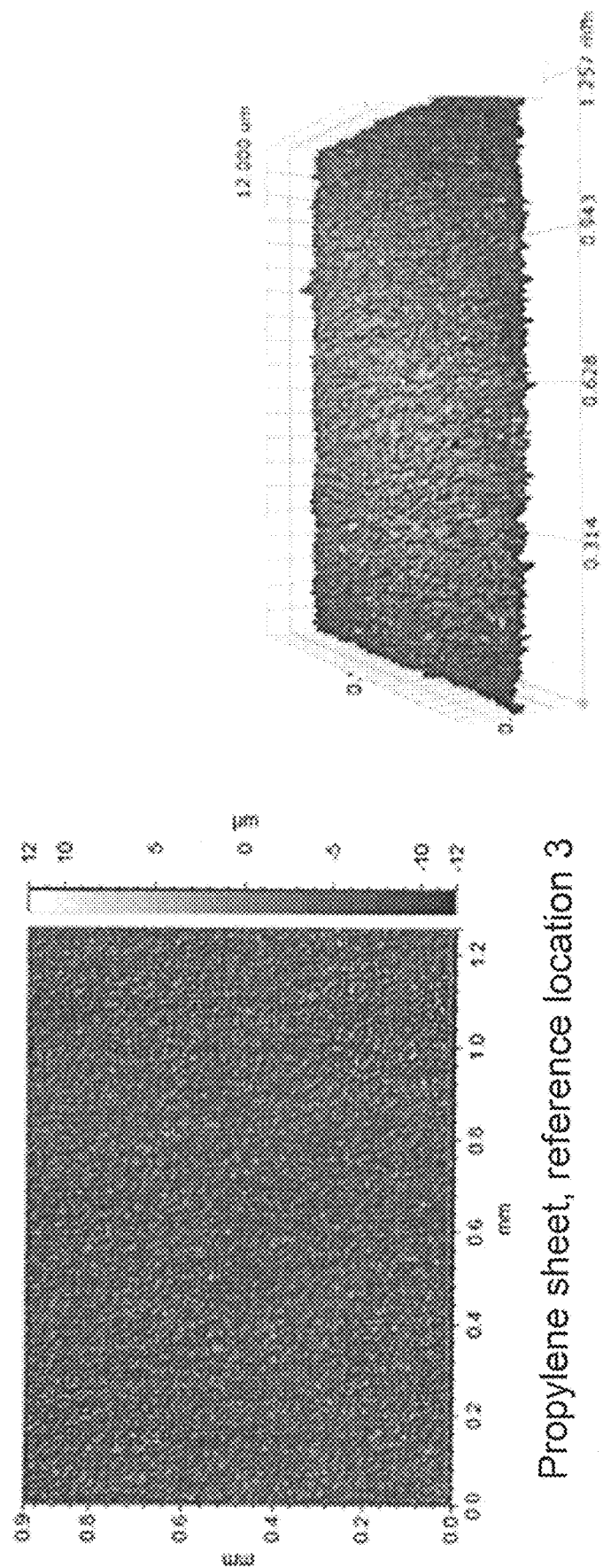
Figure 9:
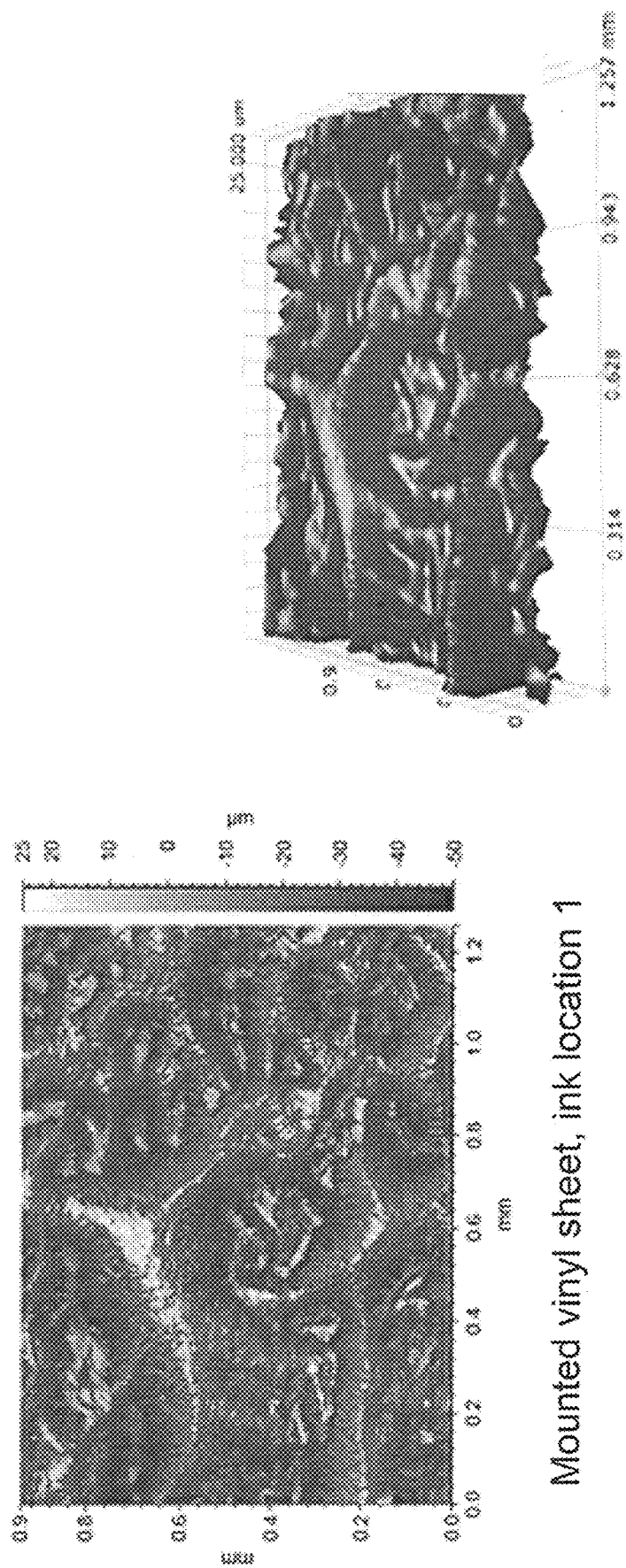
Figure 10:
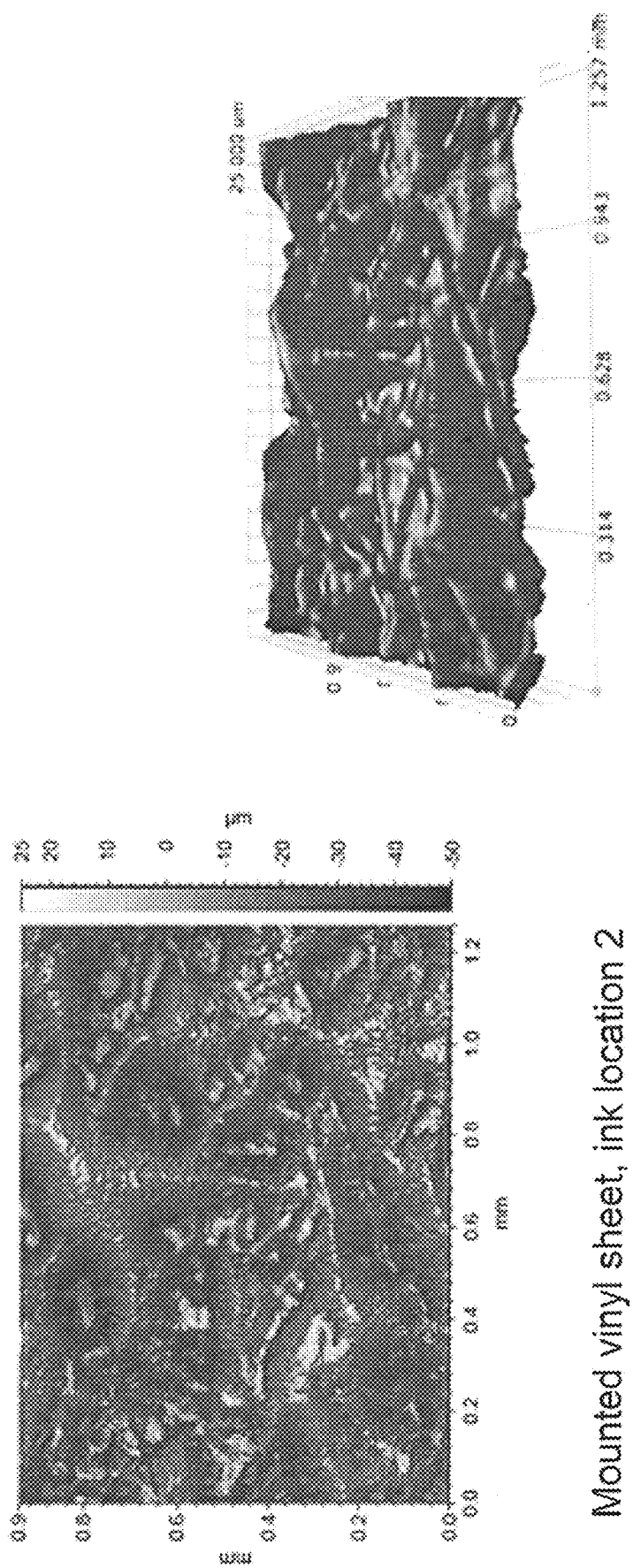
Figure 11:
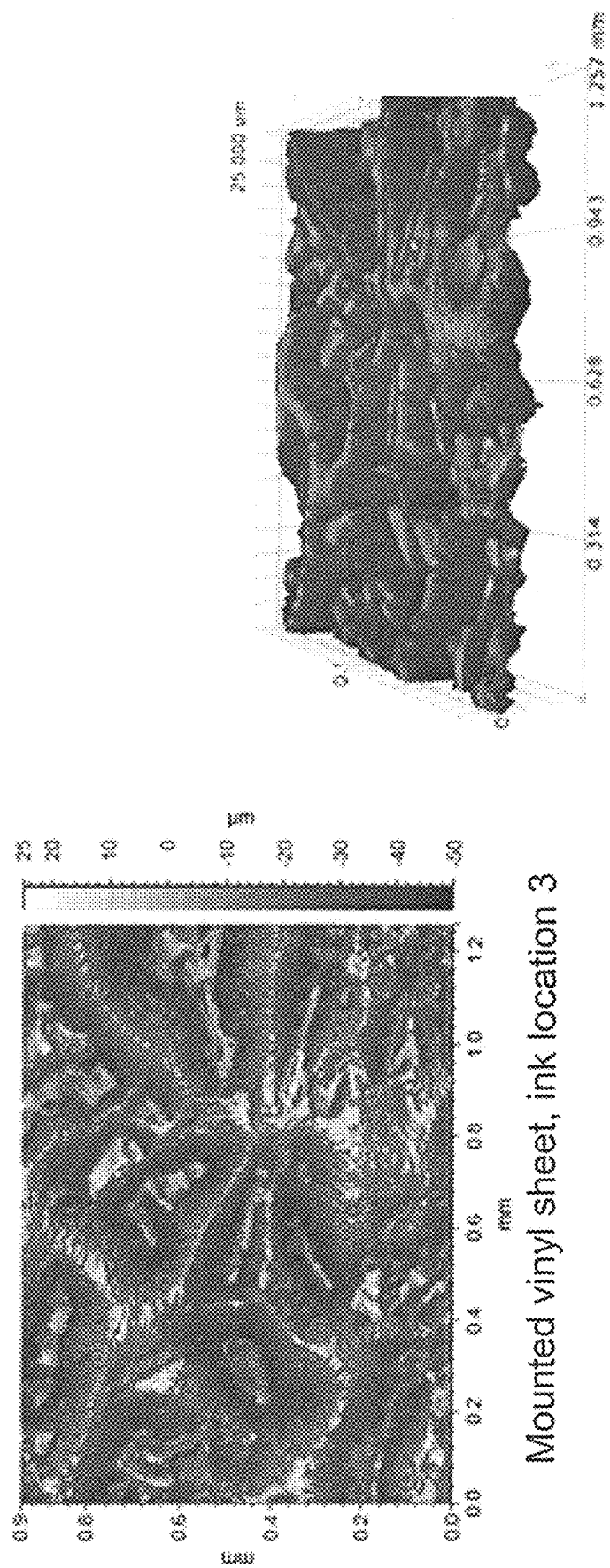
Figure 12:
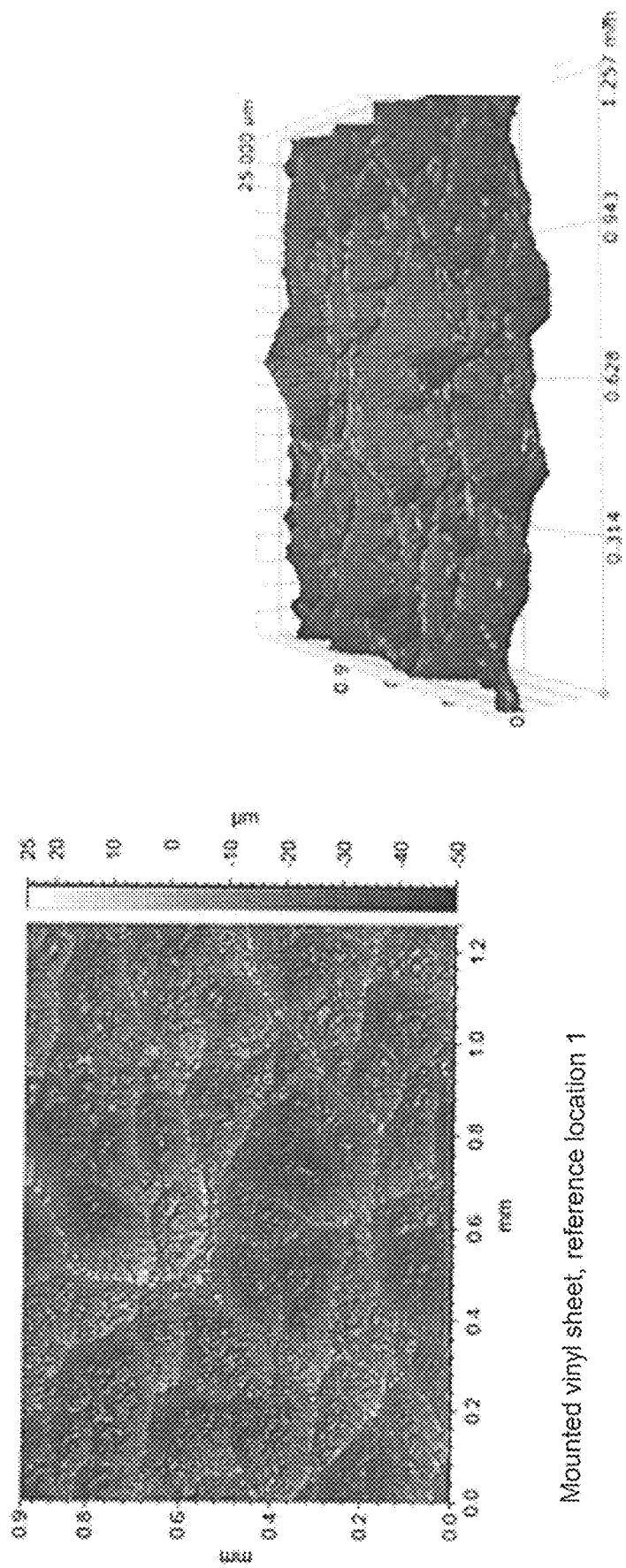
Figure 13:
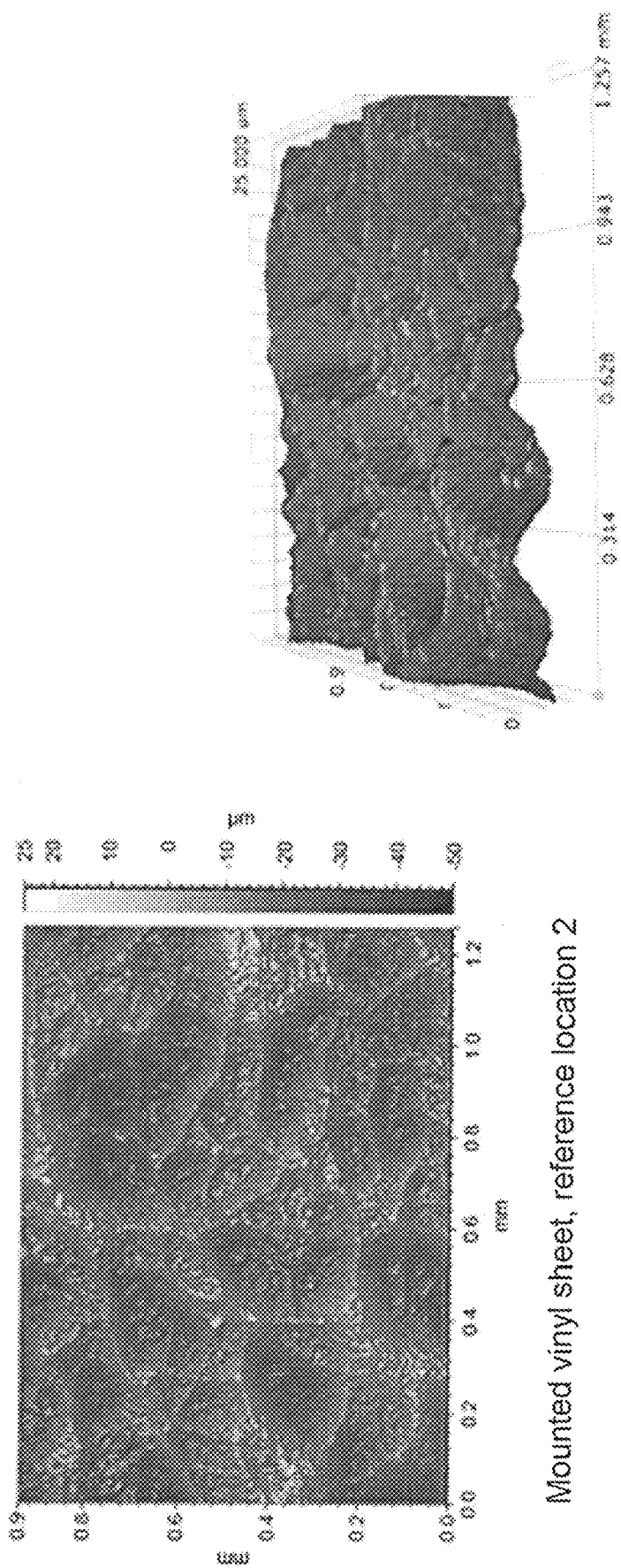
Figure 14:
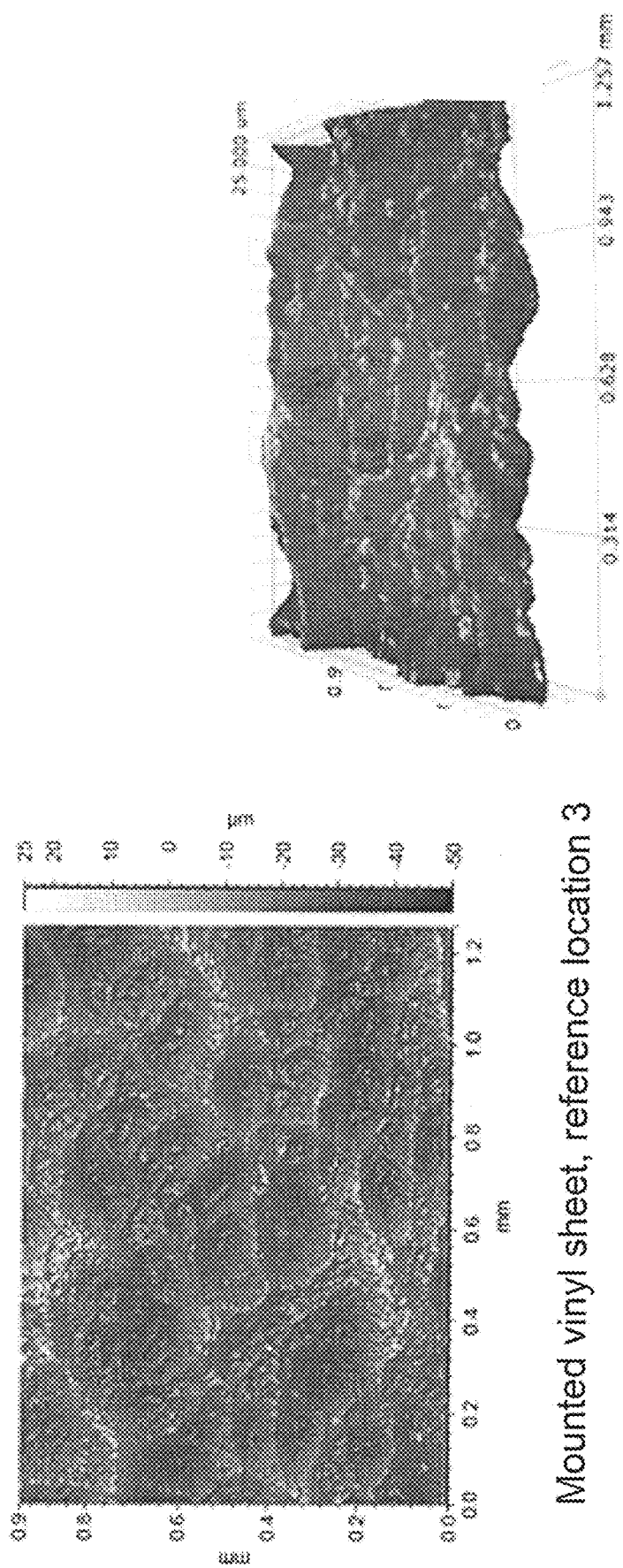

A substrate according to the invention, particularly for application of alcohol inks to produce artworks, is shown at 10 in FIG. 1, and also in cross section in FIG. 2. In this preferred embodiment the substrate has a core 12 of a stiff board, preferably fiberboard but possibly other wood-based core materials to provide a stiff backing. On the front side of the fiberboard core 12, preferably MDF, is a vinyl film 14, adhered to the core fiberboard, which can be by PVA adhesive or another suitable adhesive, preferably water-based. The vinyl film 14 has little or no real porosity such that leeching of inks through the vinyl film 14 to affect the adhesive is not an issue. It has been found that a water-based adhesive on MDF seems optimum, in that the adhesive may bring up some texture from the MDF surface and add to the texture of the mounted vinyl film.

In one preferred implementation the vinyl film 14 is a plasticized polyvinyl chloride film which is produced by Nan Ya Plastics Corporation, America of Batchelor, Louisiana. The film has compounds of PVC resin, plasticizer, a barium/zinc stabilizer, modifier and pigment. The film may have a thickness of about 3 mils, or in the range of about 2 mils to 4 mils.

The core board 12 preferably has substantial stiffness, requiring a deliberate and fairly strong force to bend the substrate 10, assuming sizes to about 8 inches by 10 inches. For this purpose it may be about ⅛ inch thick, or in the range of 1/16 inch to ¼ inch, or even thicker, especially for larger panel sizes.

As shown in FIG. 2, the substrate 10 preferably has a vinyl film coating 14 on both sides. This allows different colors on the two sides, if desired, and in addition it provides a moisture seal on both sides of the fiberboard core 12, which is needed in any event to prevent warping. Typically a canvas board or other painting substrate having a wood or fibrous core must be sealed on both sides, the back side normally not being the painting surface but simply having a sealant. With this invention the double-sided substrate therefore serves two functions.

The ink-gripping ability and the absorptive (or apparently absorptive) quality of the vinyl surface film 14 are important. The film 14 is preferably somewhat more ink-gripping than prior art polypropylene film substrates. This provides for very different effects when using alcohol inks, as compared to other alcohol ink substrates, effects which some artists find advantageous. Preferably the surface roughness of the vinyl film 14 is as discussed below. The surface preferably is matte/matte, with print grade no higher than 38 dyne.

Optical Profilometry Surface Analysis:

Optical profilometry surface analysis was performed on a polypropylene film marketed for alcohol inks, and on the vinyl surface of this invention. The analysis was performed by EAG Laboratories of Sunnyvale, California, and included both types of surface with and without alcohol inks applied, and each test performed at three different locations on a surface.

In summary, the results indicated that alcohol-based inks dry on top of propylene substrates and reduce the surface roughness. On the mounted vinyl sheet, the ink did not significantly change most aspects of surface roughness and the inked area appeared to be recessed. This data suggested that the ink was absorbed into the material and did not dry on top. The roughness results are summarized in Table 1 and Table 2, and images showing the ink/reference interfaces, i.e. at the boundary of the ink on the surface, are provided in FIGS. 15 and 16. All inks were undiluted, as constituted in newly opened Pinata (marketed by Jacquard) alcohol ink vials.

Optical Profilometry (OP) images were collected using a ContourGT-X8 optical profilometer (Bruker Corporation, Tucson, Arizona, USA). The instrument undergoes internal, automatic calibration during each measurement. In addition, the instrument performance is tested weekly with a NIST traceable step-height standard. Image processing procedures involving tilt removal, curvature removal, a low pass statistic filter, and data restoration were employed.

Ink was applied to pieces of propylene and mounted vinyl and allowed to dry. Three 1.27 mm×0.95 mm areas were imaged within the ink region and in a reference (no ink) region. Additionally, one large region was imaged by stitching multiple 2.3 mm×1.7 mm images across the ink/reference interface on each sample. Top views and perspective (3-D) views of these areas are shown in FIGS. 3-16. Topography differences of these images are indicated in gray scale in the figures.

The roughness analyses were performed and are expressed in height parameters, spatial parameters, and hybrid parameters. Commonly used height parameters to evaluate roughness include (1) Root-Mean-Square Roughness, $S_q$; (2) Roughness Average, $S_a$; and (3) Maximum Height, $S_z$. Another useful parameter may be the Developed Interfacial Area Ratio, ($S_{dr}$), which is the percent difference between the actual surface area and the surface area of a perfectly flat plane. The results are summarized in Table 1 and Table 2. An appendix that describes and explains the roughness analysis is also included.

Figure 15:
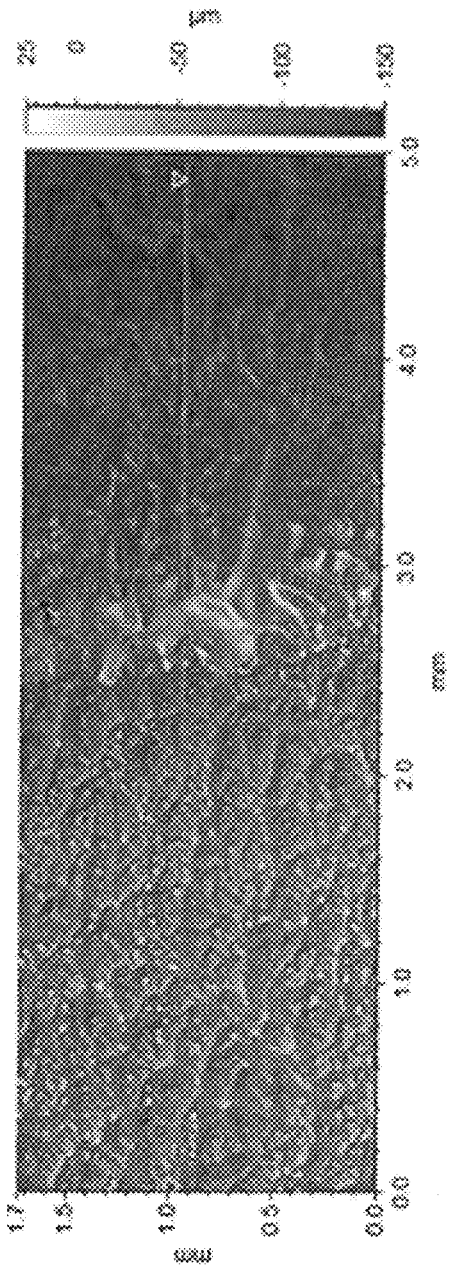
Figure 15:
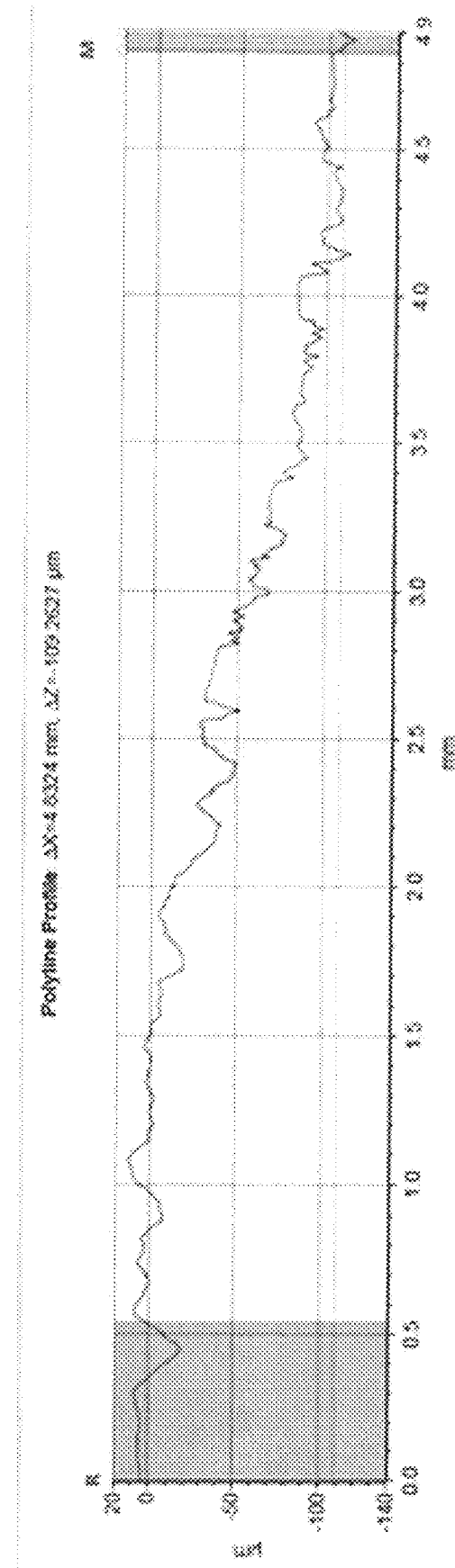
Figure 16:
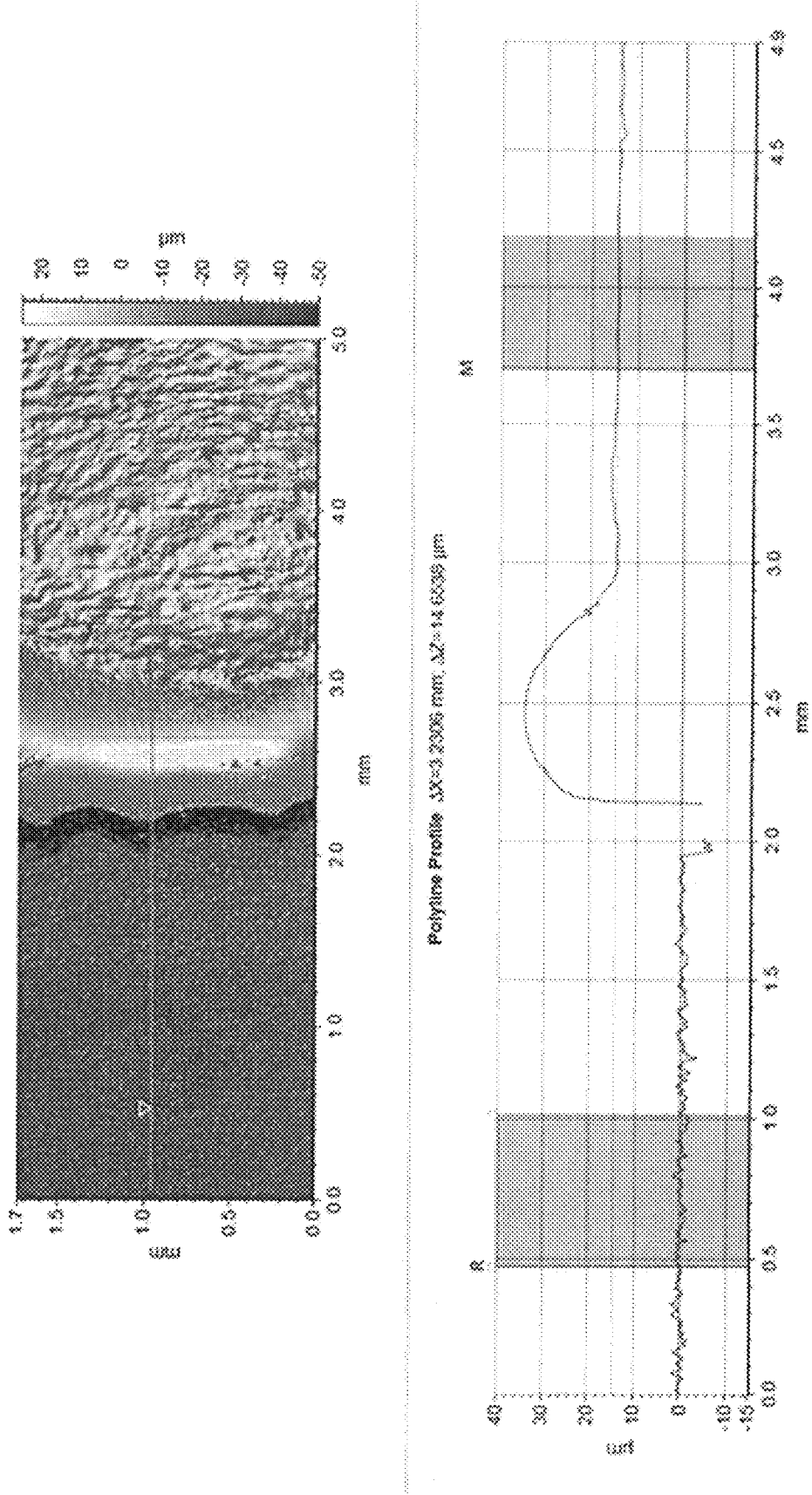
Figure 17:
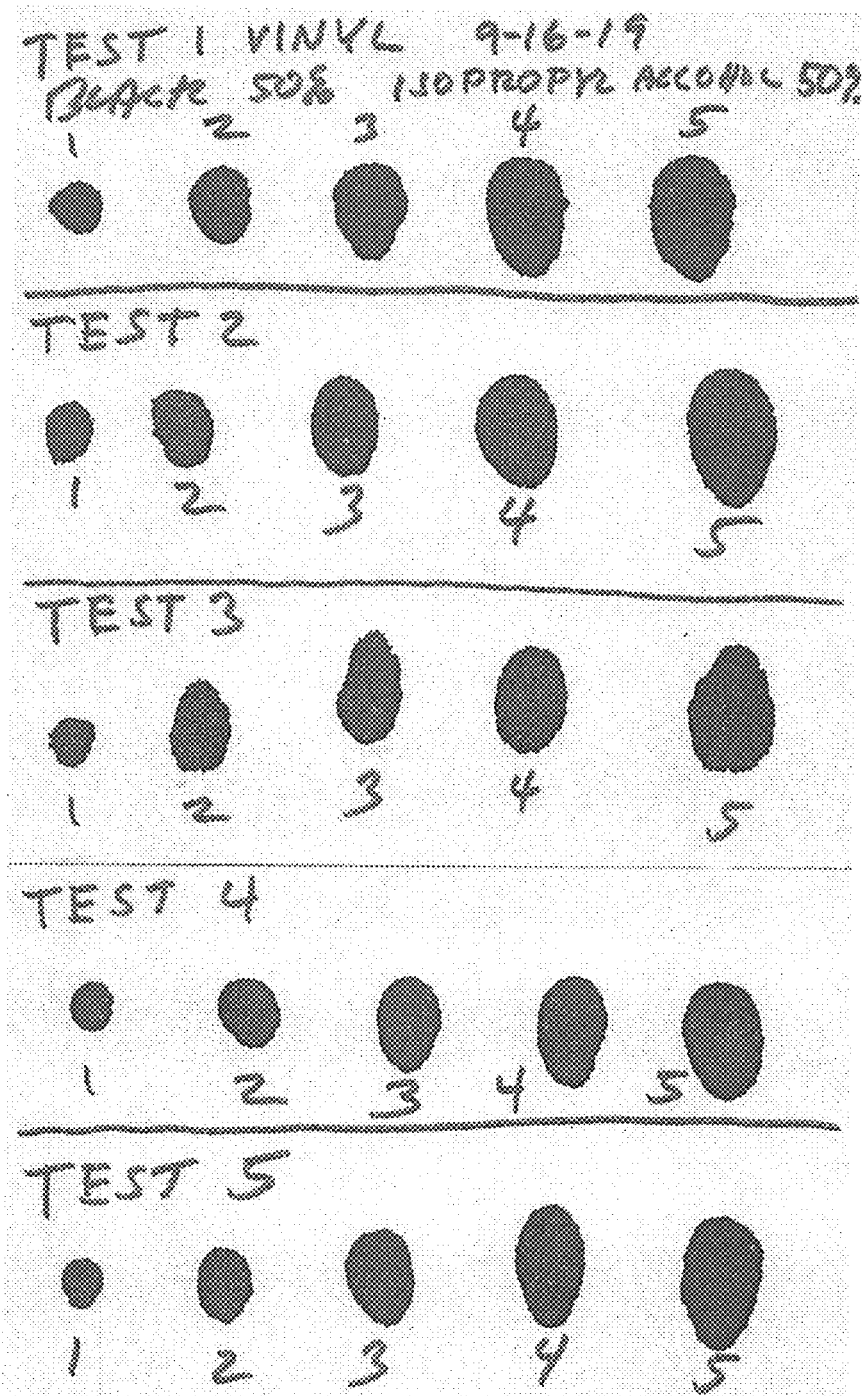
FIGS. 17-20 show alcohol ink drop tests on a vinyl surface of the invention and on a polypropylene surface, demonstrating effects of different surface characteristics.
Figure 18:
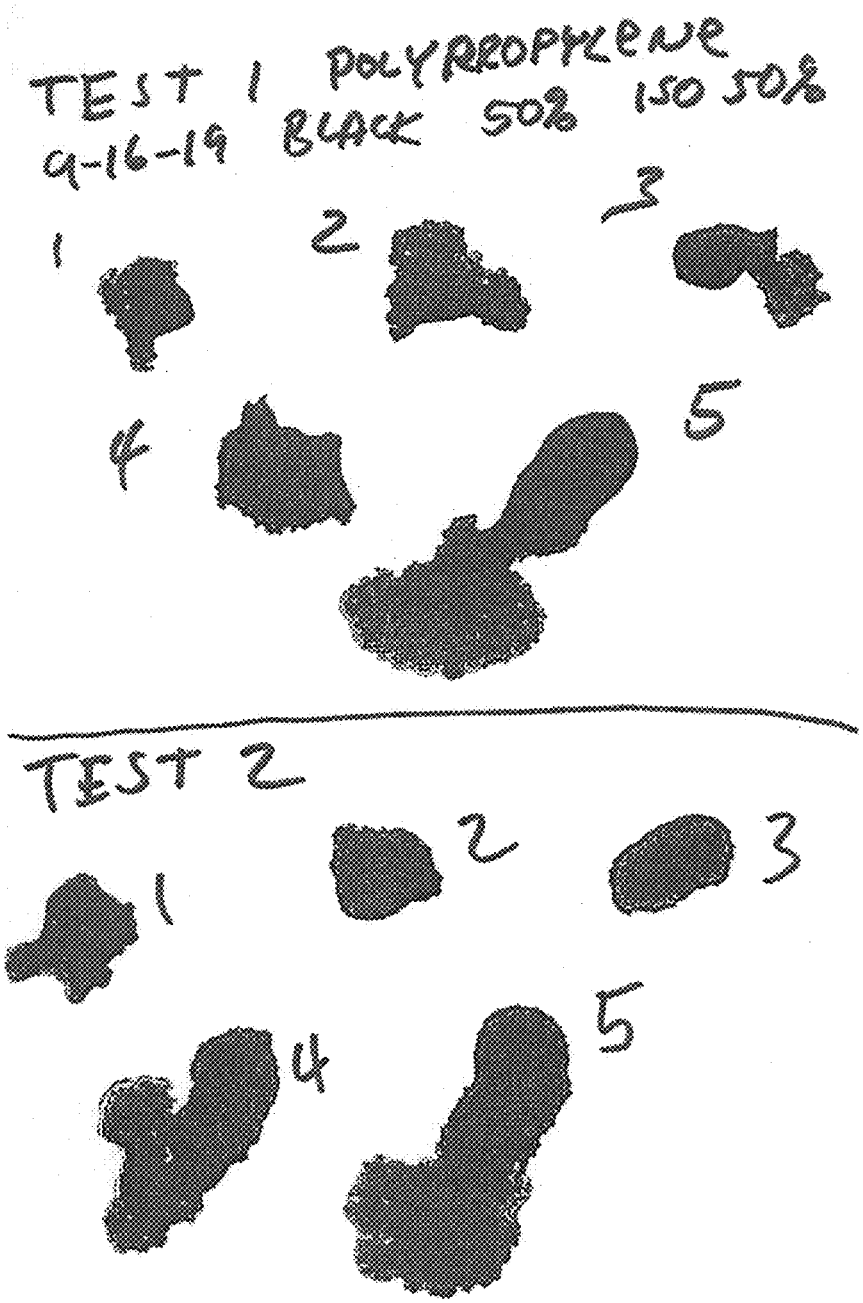
Figure 19:
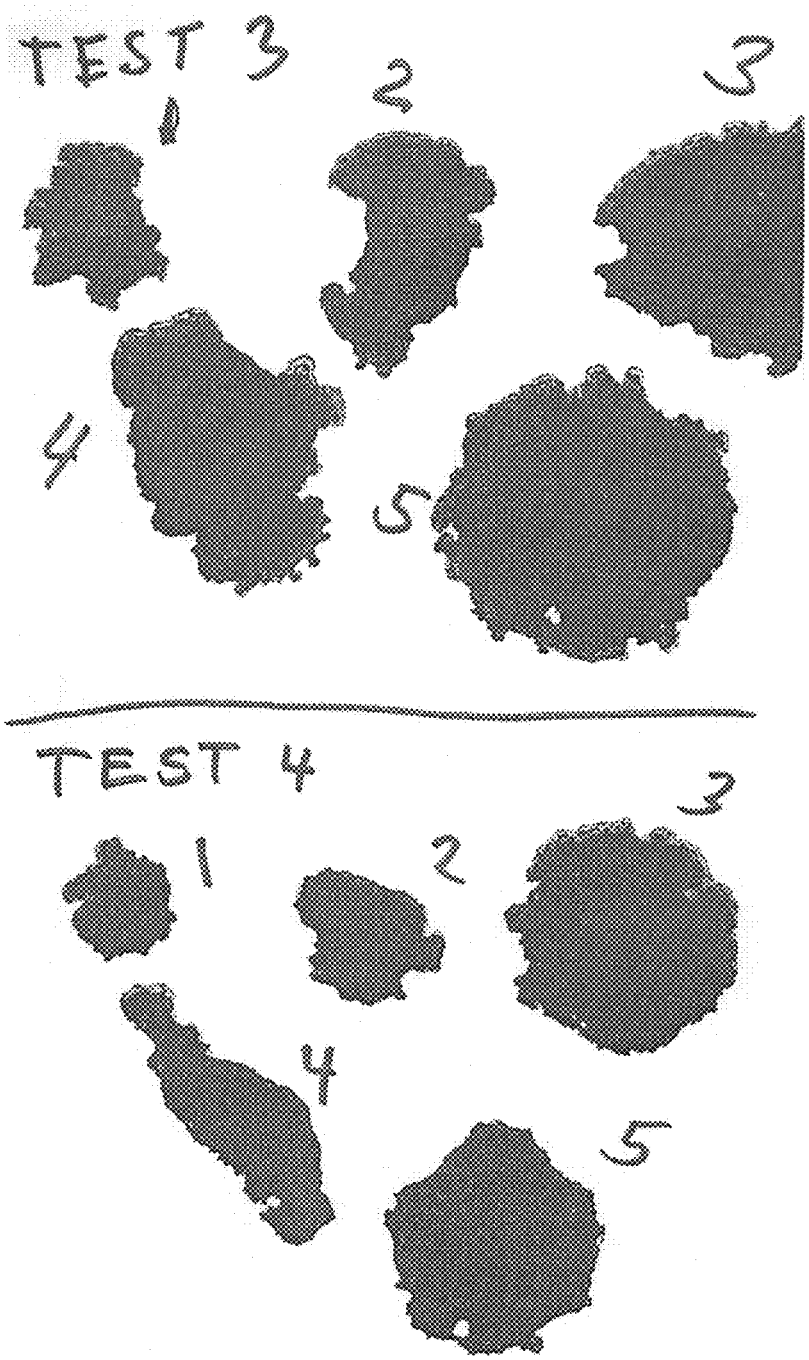
Figure 20:
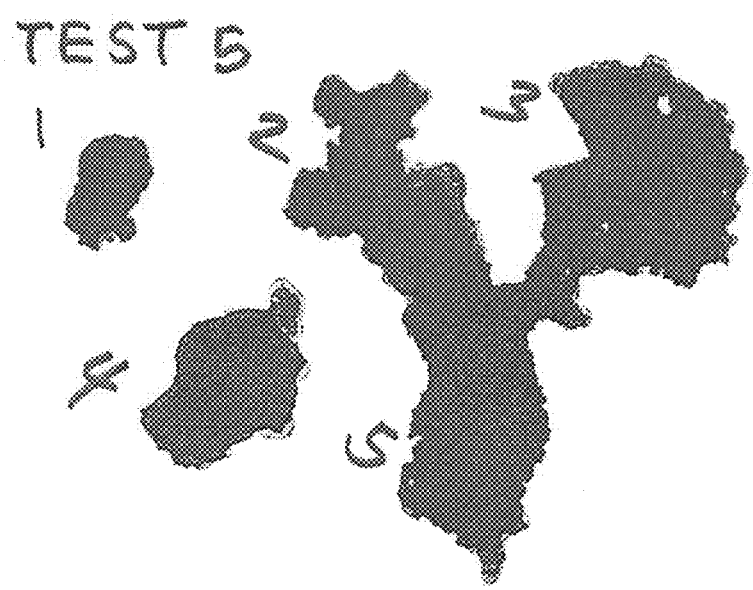

Section analyses were performed to measure the height of the inked region. The profiles were created by measuring the height values across the lateral regions shown in the 2-D images (FIGS. 15 and 16). Ink heights were determined from the profiles by measuring the differences in z-height between the two areas, inked and non-inked (reference). Reference areas are to the left and measurement (ink) areas are to the right in FIGS. 15 and 16. The heights ("ΔZ") are listed above the graphs.

Results and Interpretations:

The ink significantly reduced the surface roughness of the propylene sheet, as can be seen by the lower $S_a$, $S_q$, $S_z$, and $S_{dr}$ values (Table 1 and Table 2). While the height parameters were not greatly changed by the ink on the mounted vinyl sample, the Developed Interfacial Area Ratio, ($S_{dr}$; Surface Area Difference), was higher in the inked region. A clear step height was observed at the ink boundary on the propylene sheet indicating that the ink dried on top of that type of substrate (FIG. 15).

TABLE 1

Roughness Results - Height Parameters

| Sample ID | Location | $S_a$ (µm) | $S_q$ (µm) | $S_p$ (µm) | $S_v$ (µm) | $S_z$ (µm) | $S_{ku}$ | $S_{sk}$ |
|---|---|---|---|---|---|---|---|---|
| Propylene, Ink | 1 | 283 | 393 | 2.86 | −5.15 | 8.01 | 8.96 | −0.76 |
|  | 2 | 312 | 456 | 2.22 | −7.12 | 9.35 | 17.05 | −1.62 |
|  | 3 | 295 | 422 | 3.83 | −4.38 | 8.21 | 10.57 | −0.89 |
| Propylene, Reference | 1 | 737 | 996 | 12.29 | −12.82 | 25.11 | 8.58 | 0.25 |
|  | 2 | 720 | 945 | 11.92 | −11.90 | 23.82 | 5.70 | −0.16 |
|  | 3 | 715 | 953 | 7.18 | −9.72 | 16.90 | 5.60 | −0.07 |
| Mounted Vinyl, Ink | 1 | 7082 | 8797 | 21.65 | −35.03 | 56.69 | 2.84 | −0.30 |
|  | 2 | 7093 | 8858 | 22.67 | −34.43 | 57.10 | 2.82 | −0.19 |
|  | 3 | 8169 | 10011 | 21.89 | −41.06 | 62.96 | 2.65 | −0.44 |
| Mounted Vinyl, Reference | 1 | 6423 | 8008 | 20.90 | −26.88 | 47.79 | 2.85 | −0.24 |
|  | 2 | 7218 | 8822 | 19.85 | −27.19 | 47.04 | 2.55 | −0.33 |
|  | 3 | 8064 | 9719 | 23.66 | −29.78 | 53.44 | 2.34 | 0.10 |

TABLE 2

Roughness Results - Spatial and Hybrid Parameters

| Sample ID | Location | $S_{al}$ (µm) | $S_{td}$ (°) | $S_{tr}$ | $S_{dr}$ (%) | $S_{dq}$ (°) |
|---|---|---|---|---|---|---|
| Propylene, Ink | 1 | 38.62 | n/a | 0.50 | 0.12 | 2.76 |
|  | 2 | 43.56 | n/a | 0.51 | 0.12 | 2.83 |
|  | 3 | 30.08 | −2.67 | 0.43 | 0.11 | 2.75 |
| Propylene, Reference | 1 | 15.79 | 15.43 | 0.48 | 5.38 | 18.55 |
|  | 2 | 20.12 | −4.18 | 0.46 | 4.88 | 17.71 |
|  | 3 | 16.51 | n/a | 0.50 | 4.89 | 17.69 |
| Mounted Vinyl, Ink | 1 | 72.59 | n/a | 0.64 | 21.27 | 35.31 |
|  | 2 | 72.91 | n/a | 0.57 | 20.62 | 34.96 |
|  | 3 | 65.29 | n/a | 0.59 | 27.84 | 39.24 |
| Mounted Vinyl, Reference | 1 | 85.76 | n/a | 0.71 | 8.21 | 22.48 |
|  | 2 | 80.30 | n/a | 0.70 | 8.81 | 23.24 |
|  | 3 | 86.28 | 79.75 | 0.48 | 9.11 | 23.62 |

The estimated uncertainties of the roughness values provided are within ±3% (at an approximate level of confidence of 95% using a coverage factor of k=2). Roughness data below 6 nm should be viewed as "semi-quantitative" unless a separate z-height calibration in this range is performed. "Semi-quantitative" data still allows for comparisons between samples as the precision of the measurement is about ±10%. (The uncertainty of the absolute roughness values however is not determined.) Note that the uncertainty estimates provided assume that there is no variability in roughness between different locations sampled.

Appendix: Roughness Statistics

The Contour GT-X8 acquires 3-dimensional height information from a surface and stores the data in a digital format. The instrument software can use this height information to perform a variety of statistical analyses from the entire imaged area (e.g. $S_q$, $S_a$, $S_p$, $S_v$, and $S_z$. The calculated statistical values are listed in an "Image Statistics" box in the report figures. Additional roughness statistics, spatial statistics, and volume statistics can be calculated for the whole or for a selected portion of the image. What follows is a description and explanation of the most common statistical parameters.

Height Parameters:

Mean: The average of all of the Z values in the imaged area.

Root-Mean-Square Roughness ($S_q$): the standard deviation of the Z values in the image. It is calculated according to the formula:

$$S_q = \sqrt{\Sigma(Z_i - Z_{avg})^2/N}$$

where $Z_{avg}$ is the average Z value within the image; $Z_i$ is the current value of Z; and N is the number of points in the image.

Roughness Average ($S_a$): the mean value of the surface relative to the center plane and is calculated using the formula:

$$S_a = (1/N)\Sigma|Z_i|$$

Maximum Peak Height ($S_p$): the tallest height in the profile, relative to the mean plane.

Maximum Valley Depth ($S_v$): the lowest height in the profile, relative to the mean plane.

Maximum Height of the Profile ($S_z$): the difference in height between the highest and lowest points of the surface, relative to the mean plane.

$$S_z = S_p - Sv$$

Roughness skewness ($S_{sk}$): a measure of the asymmetry of the probability distribution of the Z values.

$$S_{sk} = [1/(NS_q3)]\Sigma(Z_{i3})$$

Roughness kurtosis ($S_{ku}$): a measure of the peakedness of the probability distribution of the Z values.

$$S_{ku} = [1/(NS_{q4})]\Sigma(Z_{i4})$$

Spatial Parameters:

Fastest Decay Autocorrelation Function ($S_{a1}$): the length of the fastest decay of the 20% of the autocorrelation function, in any direction. A high value for $S_{a1}$ indicates the surface is dominated by low frequency components.

Texture Direction of Surface ($S_{td}$): the angle of the dominant lay of the surface, relative to the Y axis. This parameter is determined from the Angular Power Spectral Density Function.

Texture Aspect Ratio ($S_{tr}$): the ratio of the fastest decay to the slowest decay to correlation 20% of the autocorrelation function. $S_{tr}$ will be closer to 0 for surfaces with a strong lay; $S_{tr}$ will be closer to 1 for surfaces having a uniform texture.

Hybrid Parameters:

Root Mean Square Surface Slope ($S_{dq}$): is a measure of the slopes that make up the surface texture, evaluated over all directions. It includes amplitude and spacing components. Lower $S_{dq}$ values may indicate wider spaced textural components:

$$S_{dq} = \sqrt{[1/A \int_0^{LY} \int_0^{LX} \{(\partial/\partial x Z(x,y))^2 + (\partial/\partial y Z(x,y))^2\} dydx]}$$

Developed Interfacial Area Ratio, ($S_{dr}$): the percentage of additional surface area contributed by the texture as compared to an ideal plane the size of the measurement region:

$$S_{dr} = [(\text{Texture Surface Area} - \text{Cross Sectional Area})]/\text{Cross Sectional Area}$$

Density of Summits, ($S_{ds}$): the number of summits per unit area. Summits are derived from peaks. A peak is defined as any point, above all 8 nearest neighbors. Summits are constrained to be separated by at least 1% of the minimum "X" or "Y" dimension comprising the 3D measurement area. Additionally, summits are only found above a threshold that is 5% of $S_Z$ above the mean plane.

Mean Summit Curvature, ($S_{sc}$): the mean summit curvature for the various peak structures. $S_{sc}$ is evaluated for each summit and then averaged over the area:

$$S_{sc} = 1/N \iint [\{\partial^2 z(x,y))/\partial^2 z(x,y))/\partial y^2\} dxdy]$$

These results tend to show that the alcohol ink, which actually appeared to be recessed into the vinyl surface, seemed to "etch into" the vinyl material to some extent. In addition, the very high $S_Z$ values for the vinyl surface, both reference and with ink, show considerable roughness of the vinyl surface as compared to polypropylene, and presumably a better gripping ability as compared to the propylene. Note that the $S_Z$ figures for propylene tend to show a smoothing of the surface with the application of ink as compared to reference, in contrast to the ink vinyl samples. This suggests that the ink basically lies on top of the propylene surface, while it seems to be somewhat absorbed, or with the characteristics of absorption, in the vinyl samples.

Thus, in a preferred embodiment the roughness average of the vinyl painting surface of the invention (without ink) preferably is in the range of about 6 microns to 8 microns, or more broadly, about 5 microns to about 10 microns. The root mean square values for the surface of the invention, $S_q$, are preferably in the range of about 8 microns to 10 microns, or more broadly, about 6 microns to 12 microns. Maximum height at any point, $S_Z$ in the table, as a summation of peak height and valley depth, preferably is in the range of about 45 to 55, more preferably about 40 to 60 microns.

The $S_{dr}$ in Table 2 are also useful in characterizing the vinyl surface of the invention, as well as the vinyl surface with alcohol ink. These are shown as 8.2% to 9.1% on the table, and preferably are in the range of about 8% to 10%, more broadly about 7% to 10.5%. With ink on the surface, the $S_{dr}$ values are strikingly higher, shown as 20.6% to 27.8% in the table. These values are preferably in the range of about 20% to 28%, more broadly about 18% to 30%.

With the substrate of the invention alcohol inks will not soak through the vinyl film at 3 mils thickness, and it appears the inks may actually etch into the vinyl to a small extent, or at least appear to do so, being tightly gripped by the vinyl surface with its roughness characteristics.

FIGS. 17 through 20 show tests conducted with black alcohol ink diluted to 50% with isopropyl alcohol (91% strength), i.e. a solution of 50% alcohol ink and 50% alcohol. Each dot was dispensed with an Eppendorf Model 4780 Repeating Laboratory Pipette according to the dial on the instrument. The dots in each test were dispensed in increasing volume according to the scale and dial on the instrument. In all of FIGS. 17 to 20 the number shown adjacent to each drop (numerals 1 through 5) represents exactly the same ink volume through all tests.

Alcohol inks are often diluted somewhat by artists, so that these tests show the effects on the vinyl surface of the invention, as opposed to polypropylene alcohol ink substrates, as would be experienced by many alcohol ink artists. The results show very clearly the much higher degree of control experienced with the vinyl substrate, as opposed to the polypropylene substrate.

As used herein, the term "about" should be understood as meaning within 5%, either direction.

The above described preferred embodiments are intended to illustrate the principles of the invention, but not to limit its scope. Other embodiments and variations to these preferred embodiments will be apparent to those skilled in the art and may be made without departing from the spirit and scope of the invention as defined by the following claims.

I claim:

1. In combination, an artist's painting substrate and artists' alcohol inks applied to the surface of the substrate, comprising:
   a stiff board having two opposed sides, of thickness in the range of at least about 1/16 inch, the board being fiberboard,
   a vinyl plastic film with a thickness in the range of about 2 to 4 mils, mounted and adhered onto one side of the board, with the alcohol inks applied directly on the surface of the vinyl plastic film,
   the vinyl plastic film having a roughness surface characteristic without ink, with an average roughness $S_a$ of about 6 to 8 microns, and
   such that the vinyl plastic film surface interacts with the alcohol inks applied to the surface so as to create controlled artistic effects by the ink-gripping and absorptive qualities of the vinyl plastic surface.

2. In combination, an artist's painting substrate and artists' alcohol inks applied to the surface of the substrate, comprising:
   a stiff board having two opposed sides, of thickness in the range of at least about 1/16 inch, the board being fiberboard,
   a vinyl plastic film mounted and adhered onto one side of the board, with the alcohol inks applied directly on the surface of the vinyl plastic film,
   the vinyl plastic film having a roughness surface characteristic without ink, exhibiting a maximum height $S_z$ of about 45 to 55 microns, and
   such that the vinyl plastic film surface interacts with the alcohol inks applied to the surface so as to create controlled artistic effects by the ink-gripping and absorptive qualities of the vinyl plastic surface.

3. In combination, an artist's painting substrate and artists' alcohol inks applied to the surface of the substrate, comprising:
   a stiff board having two opposed sides, of thickness in the range of at least about 1/16 inch, the board being fiberboard,
   a vinyl plastic film mounted and adhered onto one side of the board, with the alcohol inks applied directly on the surface of the vinyl plastic film,
   the vinyl plastic film having a roughness surface characteristic without ink, exhibiting a root-mean-square roughness of $S_q$ in a range of about 6 to 12 microns, and
   such that the vinyl plastic film surface interacts with the alcohol inks applied to the surface so as to create controlled artistic effects by the ink-gripping and absorptive qualities of the vinyl plastic surface.

4. The combination defined in claim 3, wherein the vinyl plastic film has a roughness surface characteristic without ink, exhibiting a root-mean-square roughness of $S_q$ in a range of about 8 to 10 microns.

5. In combination, an artist's painting substrate and artists' alcohol inks applied to the surface of the substrate, comprising:
   a stiff board having two opposed sides, of thickness in the range of at least about 1/16 inch, the board being fiberboard,
   a vinyl plastic film mounted and adhered onto one side of the board, with the alcohol inks applied directly on the surface of the vinyl plastic film,
   the vinyl plastic film having a roughness surface characteristic without ink, exhibiting a developed interfacial area ratio of $S_{dr}$ in a range of about 7% to 10.5%, and
   such that the vinyl plastic film surface interacts with the alcohol inks applied to the surface so as to create controlled artistic effects by the ink-gripping and absorptive qualities of the vinyl plastic surface.

6. The combination defined in claim 5, wherein the vinyl plastic film has a roughness surface characteristic with alcohol ink applied, exhibiting a developed interfacial area ratio of $S_{dr}$ in a range of about 18% to 30%.

* * * * *